(12) United States Patent
Iida et al.

(10) Patent No.: US 8,240,704 B2
(45) Date of Patent: Aug. 14, 2012

(54) PAD COVER FASTENING STRUCTURE

(75) Inventors: Hitoshi Iida, Kiyosu (JP); Osamu Hirose, Kiyosu (JP); Kenji Sasaki, Kiyosu (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 87 days.

(21) Appl. No.: 12/956,017

(22) Filed: Nov. 30, 2010

(65) Prior Publication Data

US 2011/0156376 A1    Jun. 30, 2011

(30) Foreign Application Priority Data

Dec. 25, 2009    (JP) ................................. 2009-293610

(51) Int. Cl.
*B60R 21/215*    (2011.01)
(52) U.S. Cl. ................................. 280/728.3
(58) Field of Classification Search .......... 280/728.2, 280/728.3, 731
See application file for complete search history.

(56) References Cited

U.S. PATENT DOCUMENTS

| | | | | |
|---|---|---|---|---|
| 5,305,951 A * | 4/1994 | Kuhn et al. | ................... | 229/105 |
| 5,445,409 A * | 8/1995 | Abramczyk et al. | ....... | 280/728.2 |
| 5,490,689 A * | 2/1996 | Garner et al. | .............. | 280/728.2 |
| 5,709,402 A * | 1/1998 | Leonard | ..................... | 280/728.2 |
| 6,325,407 B1 * | 12/2001 | Soderquist | ................ | 280/728.2 |
| 6,394,485 B1 * | 5/2002 | Amamori | .................. | 280/728.2 |
| 6,419,261 B1 * | 7/2002 | Ibe | ............................. | 280/728.2 |
| 6,702,319 B2 * | 3/2004 | Sczeburek et al. | ........ | 280/728.3 |
| 7,216,892 B2 * | 5/2007 | Baumbach et al. | ....... | 280/728.2 |
| 7,293,794 B2 * | 11/2007 | Clarke et al. | ................. | 280/731 |
| 2007/0096441 A1 * | 5/2007 | Cortina et al. | ............. | 280/728.3 |
| 2008/0012270 A1 * | 1/2008 | Weigand et al. | ........... | 280/728.2 |
| 2008/0073884 A1 * | 3/2008 | Kutchey et al. | ............ | 280/728.3 |
| 2010/0127482 A1 * | 5/2010 | Onohara et al. | ........... | 280/728.2 |

FOREIGN PATENT DOCUMENTS

KR    10-2009-0026529 A    3/2009

* cited by examiner

*Primary Examiner* — Paul N Dickson
*Assistant Examiner* — Robert A Coker
(74) *Attorney, Agent, or Firm* — Posz Law Group, PLC (57) ABSTRACT

A bag holder has a plurality of engagement holes about parts to which an airbag device is attached. Each engagement hole has a first long inner wall surface and a second long inner wall surface that extend along a substantially tangential direction of a circle the center of which coincides with the central axis of the bag holder, or of an opening. Engagement claws of a pad cover each include an insertion portion inserted into one of the engagement holes and a claw portion protruding from the lower end of the insertion portion toward the first long inner wall surface. The bag holder has integrally formed fastening pieces, each of which includes a support portion and a pair of coupling portions. The support portion is located in the vicinity of one of the engagement holes, and the coupling portions connect the support portion to the corresponding second long inner wall surface at several positions. Each fastening piece is bent at the coupling portions so as to contact a side surface of the insertion portion on which no claw portion is provided.

8 Claims, 10 Drawing Sheets

PAD COVER FASTENING STRUCTURE

BACKGROUND OF THE INVENTION

The present invention relates to a structure for fastening a pad cover to a bag holder in a steering wheel having an airbag device.

For example, the description of Korean Patent Application Publication No. 10-2009-0026529 discloses such a fastening structure for a pad cover. This fastening structure will now be described with reference to FIGS. 15 to 17. A steering wheel with an airbag device 80 has a bag holder 70 and a pad cover 90 in addition to the airbag device 80.

The bag holder 70 is formed by pressing a metal plate, and is arranged below the airbag device. The airbag device 80 is fixed to the bag holder 70 with bolts 81 and nuts 82 (see FIG. 16). The bag holder 70 has a plurality of engagement holes 71, each of which is located in the vicinity of a part to which the airbag device 80 is attached, that is, near a bolt 81 and a nut 82. Each engagement hole 71 extends linearly along a substantially tangential direction of a circle the center of which coincides with the central axis CL of the bag holder 70, that is, along a substantially tangential direction of a circular opening 72. To distinguish the parts of the inner wall of each engagement hole 71, a pair of inner walls facing each other along the radial direction of the above circle, that is, the opening 72, are defined as "long inner wall surfaces 73", and a pair of inner walls facing each other along the substantially tangential direction of the circle are referred to as "short inner wall surfaces 74."

Figure 15:
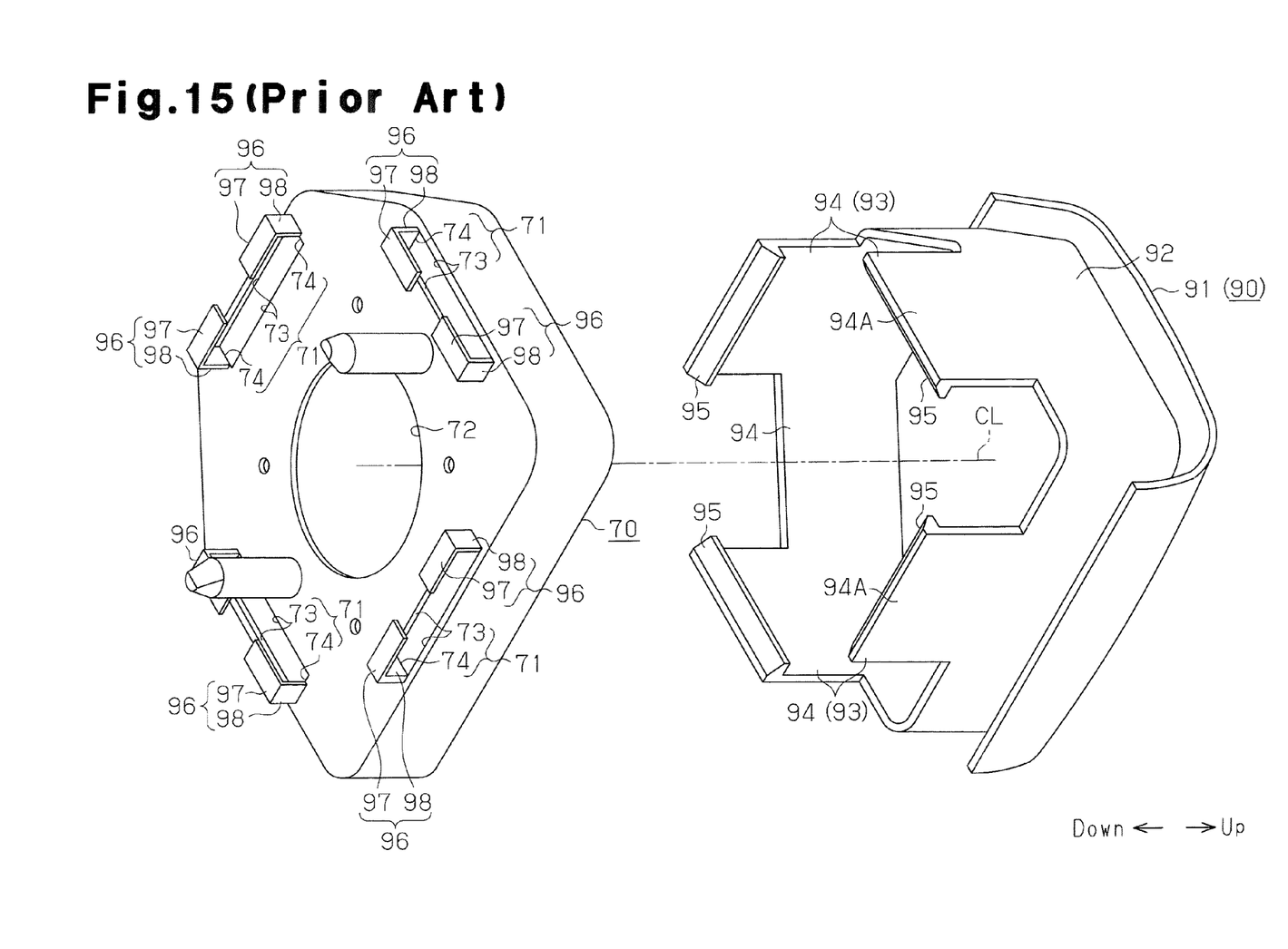
FIG. 15 is a perspective view illustrating a prior art pad cover before being fastened to a bag holder.

The pad cover 90 has a lid 91 covering the airbag from above, an annular accommodation wall 92 covering the airbag from the sides, and a plurality of engagement claws 93 at the lower end of the accommodation wall 92. The pad cover 90 is entirely formed of synthetic resin. Each engagement claw 93 is formed by an insertion portion 94 inserted into the engagement hole 71 and a claw portion 95 bulging from the lower end of the insertion portion 94 toward one of the long inner wall surfaces 73.

Figure 16:
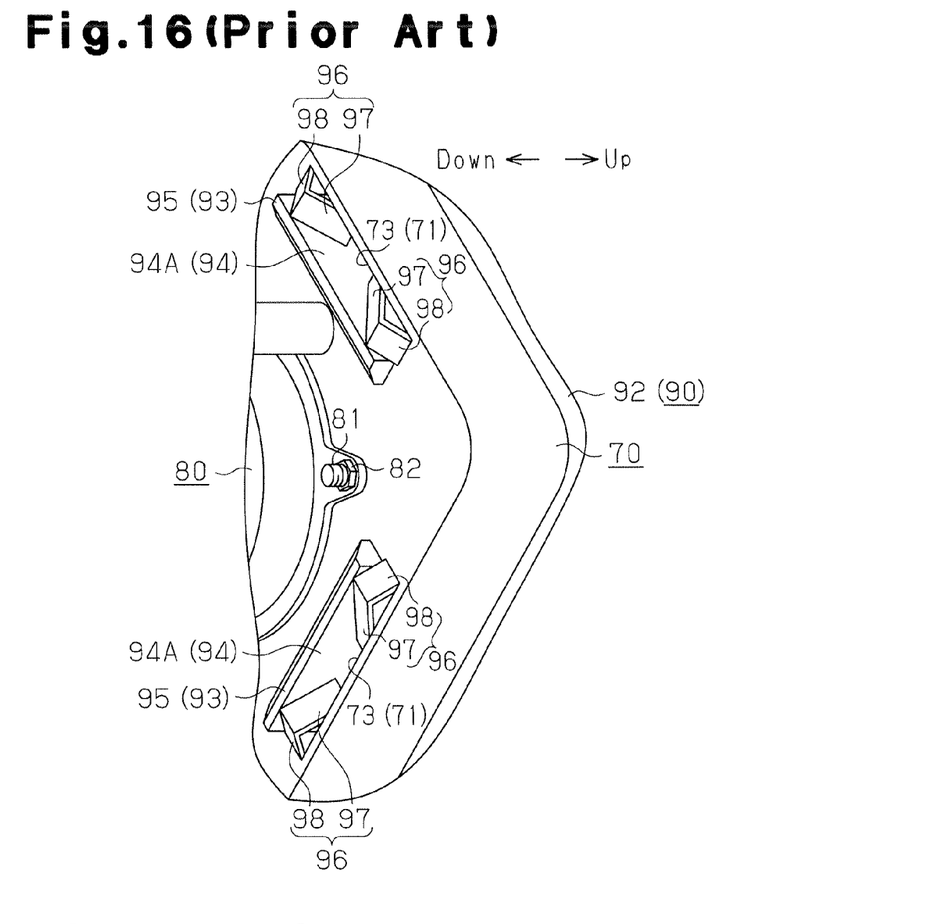
FIG. 16 is a partial perspective view illustrating the pad cover of FIG. 15 when it is fastened to the bag holder.

The insertion portion 94 of each engagement claw 93 is inserted into the corresponding engagement hole 71, and the claw portion 95 is hooked to the lower surface of the bag holder 70 in the vicinity of the adjacent long inner wall surface 73, so that the engagement claw 93 is locked. Through the locking of the claw portions 95 of the engagement claws 93, the pad cover 90 is fastened to the bag holder 70.

Figure 17:
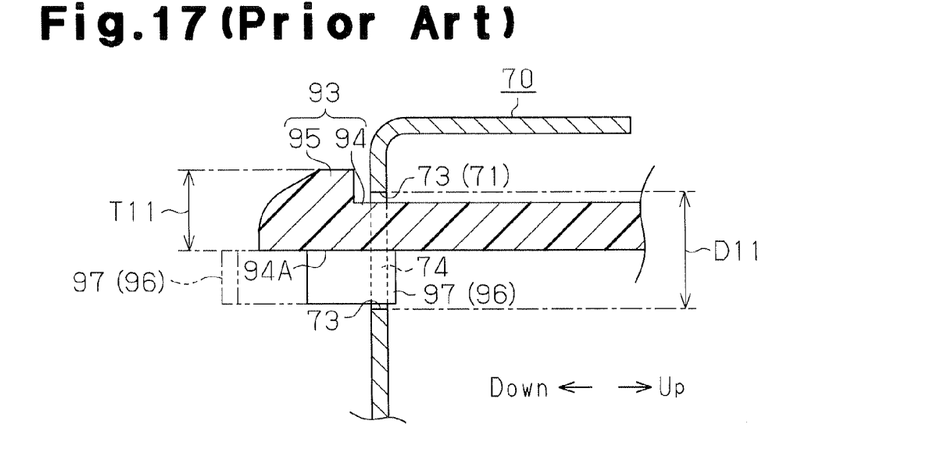
FIG. 17 is a cross-sectional view illustrating an engagement claw of the pad cover shown in FIG. 15 when the claw is locked to an engagement hole of the hag holder.

According to the above described fastening structure, the space D11 between the long inner wall surfaces 73 of each engagement hole 71 is set to be greater than the maximum thickness T11 of the engagement claw 93 as shown in FIG. 17, so that the engagement claw 93 can be inserted. The maximum thickness of the engagement claw 93 refers to the thickness of a part in which the claw portion 95 protrudes by the greatest amount.

When the airbag is inflated, the accommodation wall 92 and the engagement claws 93, which are made of synthetic resin, are pushed by the airbag and flexed to bulge outward. In contrast, the metal bag holder 70 is not deformed significantly when the airbag is inflated. The engagement holes 71 are not deformed significantly when the airbag is inflated, either. Thus, when the airbag is inflated, the engagement claws 93 are moved and flexed within the engagement holes 71. As a result, the claw portions 95 may be disengaged from the lower surface of the bag holder 70, and the engagement claws 93 may come off the engagement holes 71.

To deal with such problems, the apparatus of the above described publication has a pair of fastening pieces 96 in each engagement hole 71. Each fastening piece 96 has a support portion 97 parallel with the bag holder 70 and a coupling portion 98 for coupling the support portion 97 to the inner wall surface 74. With each engagement claw 93 inserted in the corresponding engagement hole 71, the corresponding fastening pieces 96 are bent at the boundary between the coupling portion 98 and the short inner wall surface 74. This causes a part of each support portion 97 to be inserted into the engagement hole 71 on the back side of the engagement claw 93, that is, on the side opposite to the claw portion 95. A back surface 94A of each insertion portion 94, which is on the side opposite to the claw portion 95, contacts the fastening pieces 96, so that the engagement claw 93 is prevented from moving in the corresponding engagement hole 71. As a result, the engagement claws 93 are prevented from coming off the engagement holes 71 without adding other components.

However, in the fastening structure for a pad cover according to the above described publication, the interstice between the insertion portion 94 of each engagement claw 93 and the corresponding long inner wall surface 73 cannot be easily eliminated when the fastening pieces 96 are bent and a part of each support portion 97 is inserted into the engagement hole 71. Whether it is possible to eliminate such an interstice is determined mainly by the width of the fastening pieces 96. If the width is less than an adequate value, the fastening pieces 96 cannot firmly press the engagement claws 93, and an interstice is created between each fastening piece 96 and the corresponding long inner wall surface 73. This causes the engagement claws 93 to chatter in the engagement holes 71. On the other hand, if the width is greater than the adequate value, the fastening pieces 96 cannot be easily inserted into the engagement holes 71.

SUMMARY OF THE INVENTION

Accordingly, it is an objective of the present invention to provide a fastening structure for a pad cover that allows engagement claws to contact long inner wall surfaces without an interstice, and without increasing the number of components.

To achieve the foregoing objective and in accordance with one aspect of the present invention, a pad cover fastening structure for an airbag device having an airbag is provided. The fastening structure includes a pad cover and a bag holder in which the airbag device is attached to the lower surface of the bag holder for use. The bag holder is located below the airbag of the airbag device and is fastened to the pad cover at a plurality of positions. The bag holder includes a central axis, a plurality of engagement holes formed about the attaching positions of the airbag device, and a plurality of fastening pieces that are integrally formed with the bag holder so as to correspond to the engagement holes. Each engagement hole has a first long inner wall surface and a second long inner wall surface that face each other while linearly extending along a substantially tangential direction of a circle the center of which coincides with the central axis of the bag holder. Each fastening piece includes a support portion and a plurality of coupling portions. The support portion is located in the vicinity of the corresponding engagement holes. The coupling portions connect the support portion to the second long inner wall surface at a plurality of positions. The pad cover includes an annular accommodation wall covering the airbag from the side, and a plurality of engagement claws provided below the accommodation wall. Each engagement claw includes an insertion portion for being inserted into the corresponding engagement holes, a claw portion that protrudes from the lower end of the insertion portion toward the corresponding first long inner wall surface, and a back surface located on the side opposite to the claw portion with respect to the insertion portion. The claw portions and the insertion portions are inserted into the engagement holes, such that each claw portion is locked to the lower surface of the bag holder in the vicinity of the first long inner wall surface. Each coupling piece is bent at the coupling portions and caused to contact the back surface of the insertion portion.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Hereinafter, a fastening structure for a pad cover according to one embodiment of the present invention will be described with reference to FIGS. 1 to 14.

Figure 1:
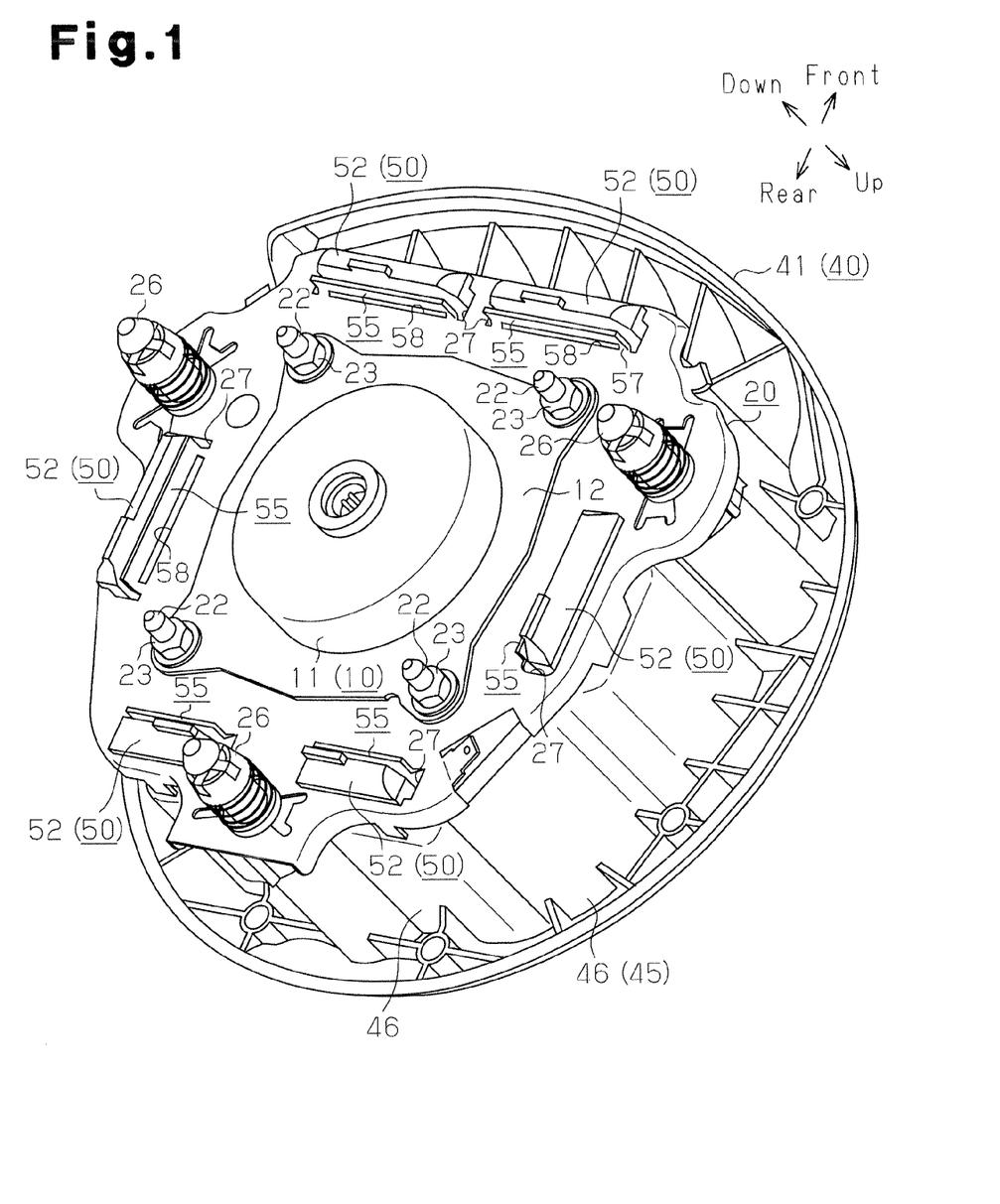
FIG. 1 is a perspective view of a fastening structure for a pad cover according to one embodiment of the present invention, illustrating a state in which an airbag device and the pad cover are fastened to a bag holder.
Figure 2:
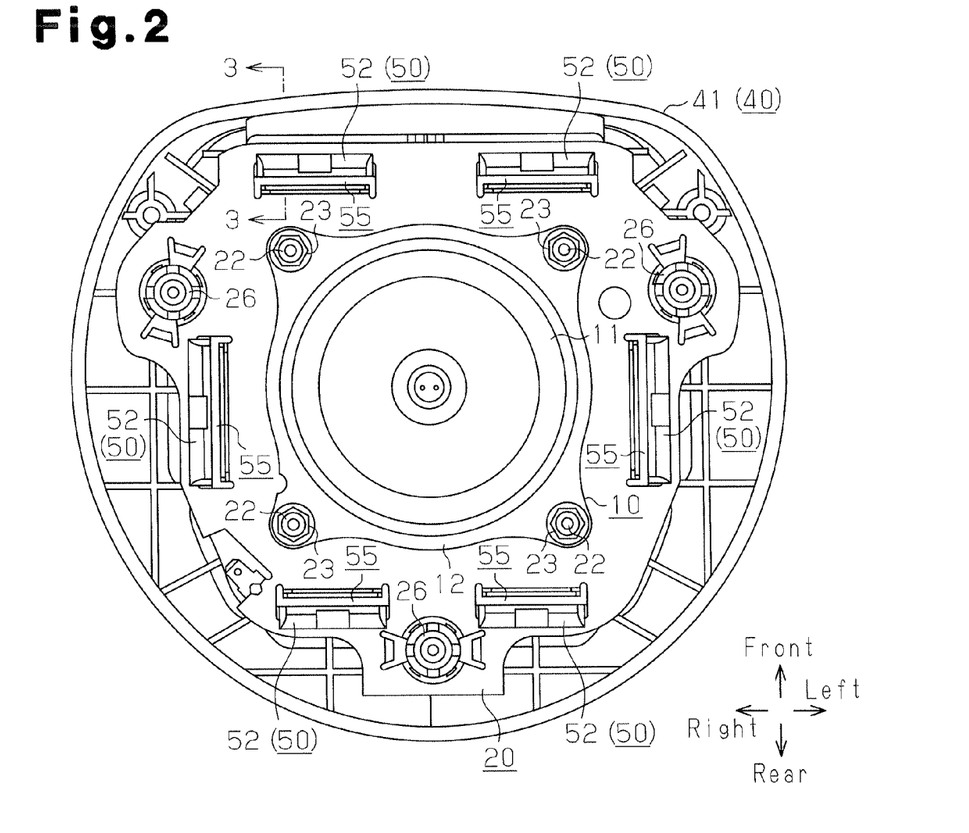
FIG. 2 is a bottom view showing the fastening structure for a pad cover shown in FIG. 1.

As shown in FIGS. 1 and 2, a steering wheel with an airbag device 10 includes a bag holder 20 and a pad cover 40. The airbag device 10 is fastened to the pad cover 40 via the bag holder 20.

The airbag device 10 has an airbag (not shown) and an inflator 11. The airbag is formed of a woven cloth sheet in a bag shape. The airbag has such a size that it can be inflated and deployed between the steering wheel and the driver. Being folded in such a manner that it can be inflated and deployed, the airbag has a compact form. At its lower end, the airbag has an opening through which inflation gas from the inflator 11 flows in.

The inflator 11 has a cylindrical form with a low height. The inflator 11 accommodates in it a gas generating agent (not shown), and generates gas by combustion reaction of the gas generating agent. In place of a type using the gas generating agent as described above, it is possible to use, as the inflator 11, a type of inflator that breaks a partition wall of a high-pressure gas cylinder filled with a high-pressure gas by a low explosive so as to discharge the gas. A flange 12 is formed at the outer circumference of the inflator 11. The inflator 11 also has a plurality of gas ports (not shown) for discharging the inflation gas. The gas ports are formed in the outer circumference above the flange 12.

Figure 4:
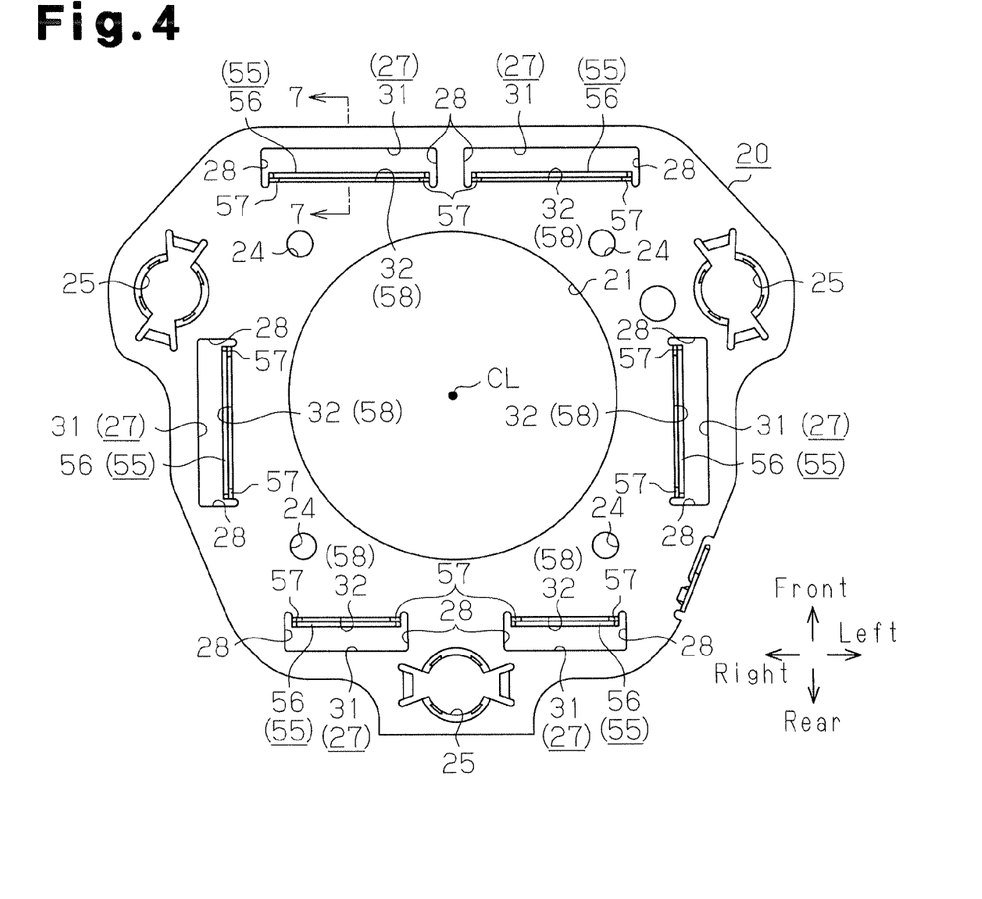
FIG. 4 is a bottom view illustrating the bag holder of FIG. 1.
Figure 5:
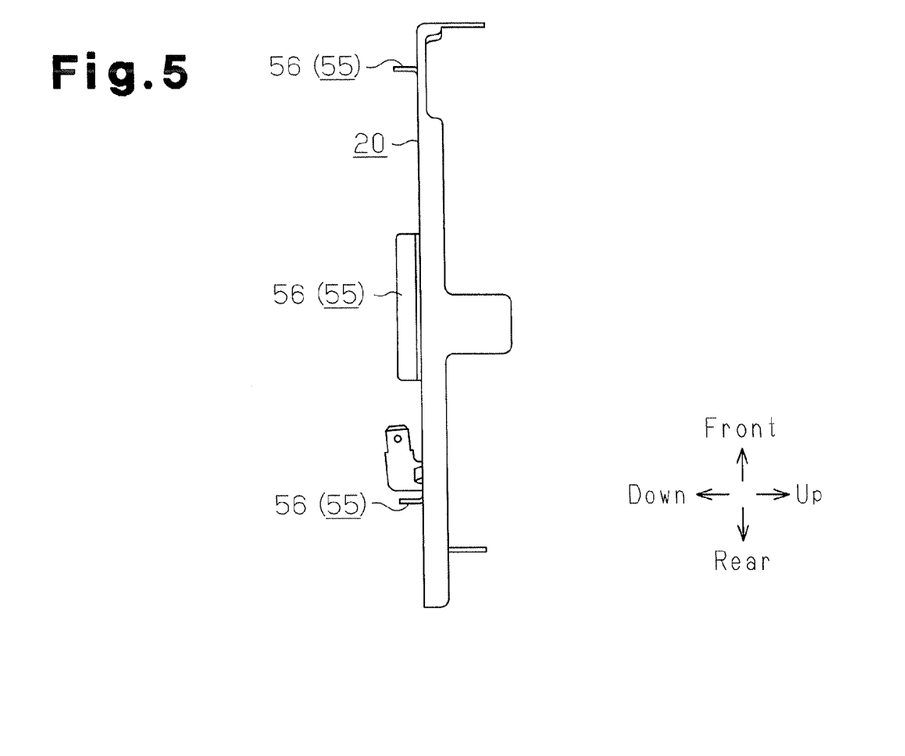
FIG. 5 is a right side view showing the bag holder of FIG. 4.

As shown in FIGS. 4 and 5, the bag holder 20, which includes fastening pieces 55 discussed below, is formed by pressing a metal plate, and is located below the airbag. A circular opening 21 is formed in a center portion of the bag holder 20. The opening 21 is located immediately below the opening at the lower end of the airbag. A part of the inflator 11 above the flange 12 is inserted into the opening 21 from below the bag holder 20. A retainer (not shown) is located above the opening of the airbag. The opening of the airbag is held between the retainer and the flange 12 of the inflator 11. Bolts 22 extend through the retainer, the airbag, the bag holder 20, and the flange 12 at several positions about the opening 21, and a nut 23 is threaded to each bolt 22 (see FIGS. 1 and 2). Reference numerals 24 in FIG. 4 represent parts in the bag holder 20 through which the bolts 22 extend, or bolt insertion holes. Through the threading, the airbag is fixed to the bag holder 20, and the inflator 11 is fixed to the bag holder 20.

Attachment holes 25 are formed through several (three, in the present embodiment) positions in the bag holder 20. A horn switch mechanism 26 for activating a horn device (not shown) of the vehicle is attached to each attachment hole 25 (see FIGS. 1 and 2). By attaching the horn switch mechanisms 26 to the core (not shown), which forms the framework of the steering wheel, the bag holder 20 is supported by the core via the horn switch mechanisms 26. Accordingly, the airbag device 10, the bag holder 20, and a pad portion including the pad cover 40 are supported in a floating state by the core. Thus, the pad portion can be moved, or displaced, forward and rearward via deformation of the horn switch mechanisms 26.

As shown in FIG. 4, a plurality of (six in the present embodiment) engagement holes 27 are formed in the bag holder 20 at positions about the bolt insertion holes 24. With respect to the opening 21, the engagement holes 27 are provided at two front positions, two rear positions, one left position, and one right position.

Each engagement hole 27 is an elongated rectangular hole that extends linearly along a substantially tangential direction of the circular inner wall of the opening 21, the center of which coincides with the central axis CL of the bag holder 20. To distinguish the parts of the inner wall of each engagement hole 27, a pair of inner walls facing each other along the radial direction of the opening 21, are defined as "long inner wall surfaces", and a pair of inner walls facing each other along a substantially tangential direction of the circle are referred to as "short inner wall surfaces 28." Further, to distinguish the pair of long inner wall surfaces from each other, the long inner wall surface located at a position farther from the opening 21 is defined as a "first long inner wall surface 31," and the long inner wall surface located at a position closer to the opening 21 is defined as a "second long inner wall surface 32."

Figure 8:
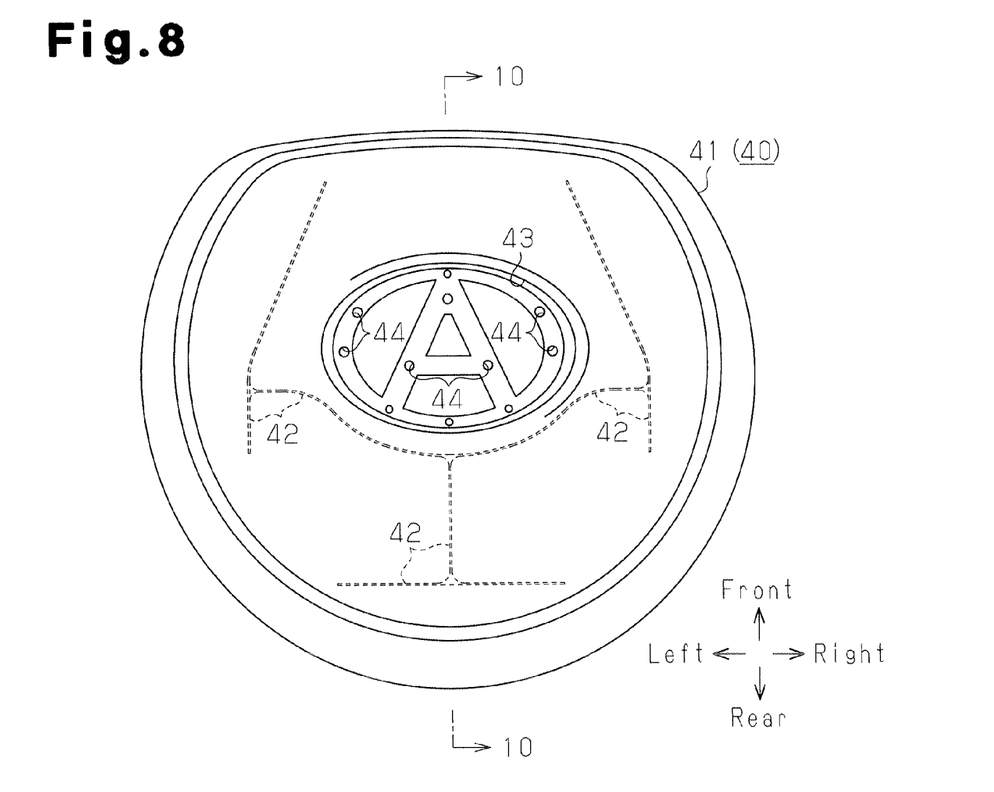
FIG. 8 is a plan view showing the pad cover shown in FIG. 1.
Figure 9:
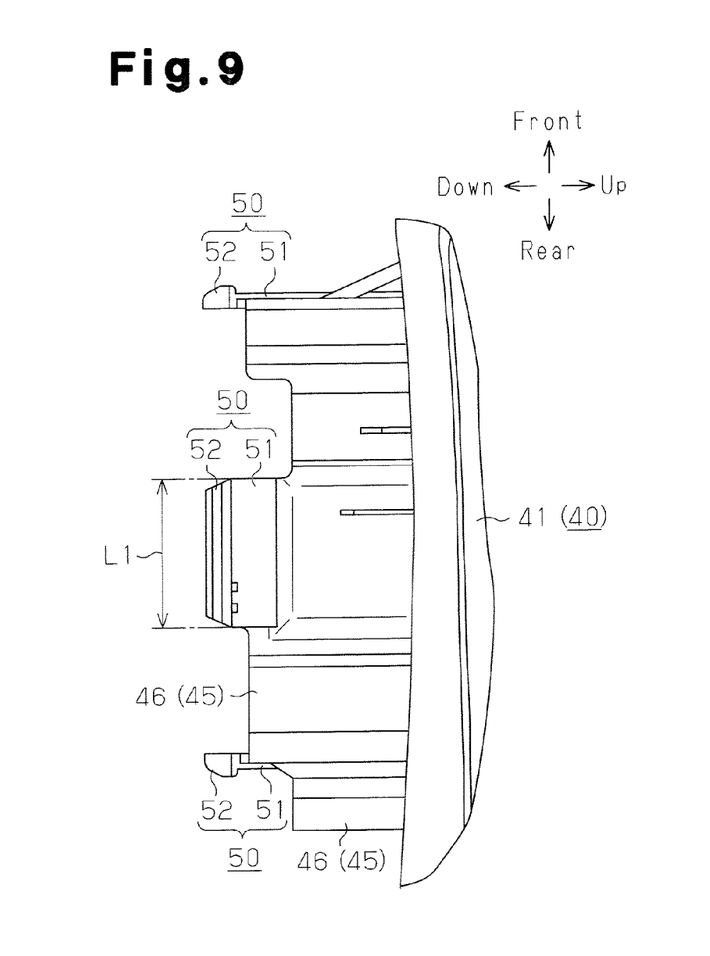
FIG. 9 is a left side view showing the pad cover of FIG. 8.
Figure 10:
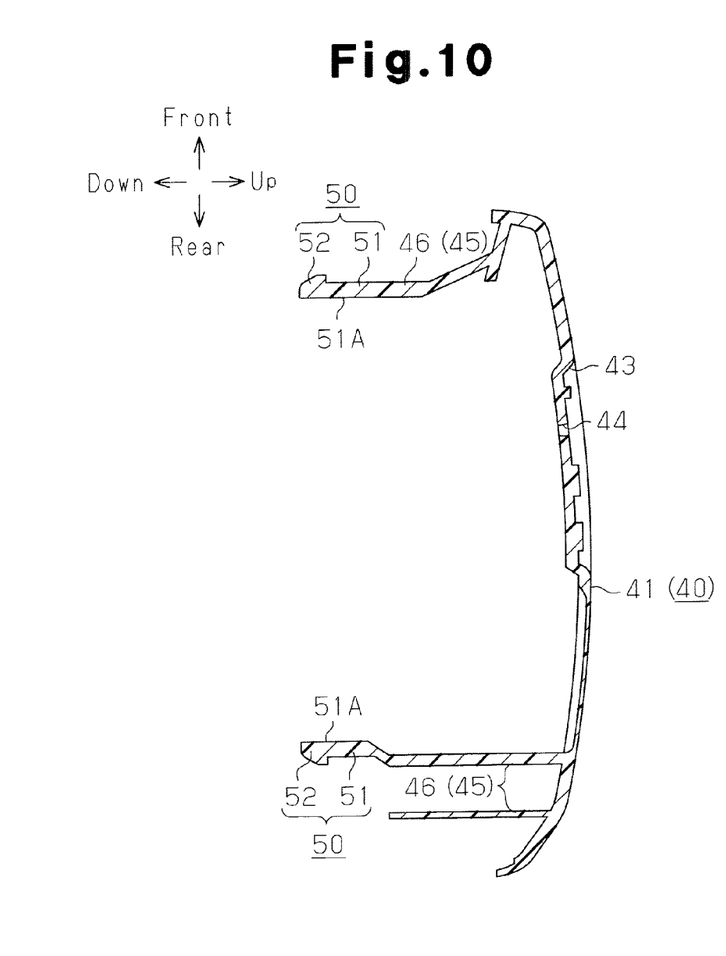
FIG. 10 is a cross-sectional view taken along line 10-10 of FIG. 8.

As shown in FIGS. 8 to 10, the pad cover 40 includes a lid 41, an accommodation wall 45, and a plurality of engagement claws 50, and is entirely formed of synthetic resin. The number of the engagement claws 50 is six, which is the same number as that of the engagement holes 27. The lid 41 is a part pressed by a hand when the horn device (not shown) is activated, and covers the folded airbag from above. Breakable portions 42 are formed on the lower surface of the lid 41 (see FIG. 8). The breakable portions 42 have a smaller thickness than the remainder of the lid 41. The breakable portions 42 have a lower strength than the remainder of the lid 41. Therefore, when the airbag is inflated and deployed, the lid 41 is broken at the breakable portions 42.

A substantially oblong stepped recess 43 is formed substantially in a center portion of the upper surface of the lid 41 (see FIGS. 8 and 10). An ornamental member (not shown) for enhancing the external quality, that is, the appearance, of the pad cover 40 is attached to the stepped recess 43. A plurality of pin insertion holes 44 for receiving ornamental pins (not shown) are formed in the stepped recess 43.

The accommodation wall 45 is shaped substantially as a rectangular loop, and extends from the lower surface of the lid 41 so as to cover the airbag from the sides.

Figure 3:
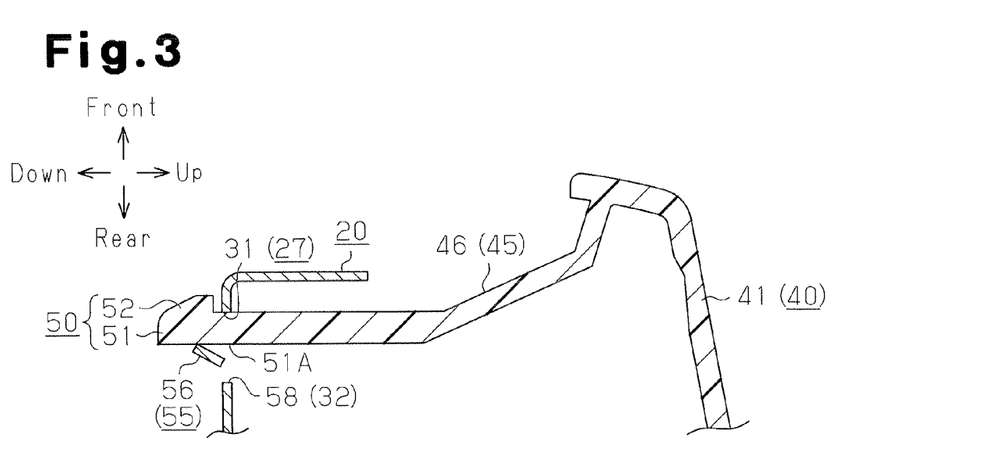
FIG. 3 is a cross-sectional view taken along line 3-3 of FIG. 2.
Figure 7:
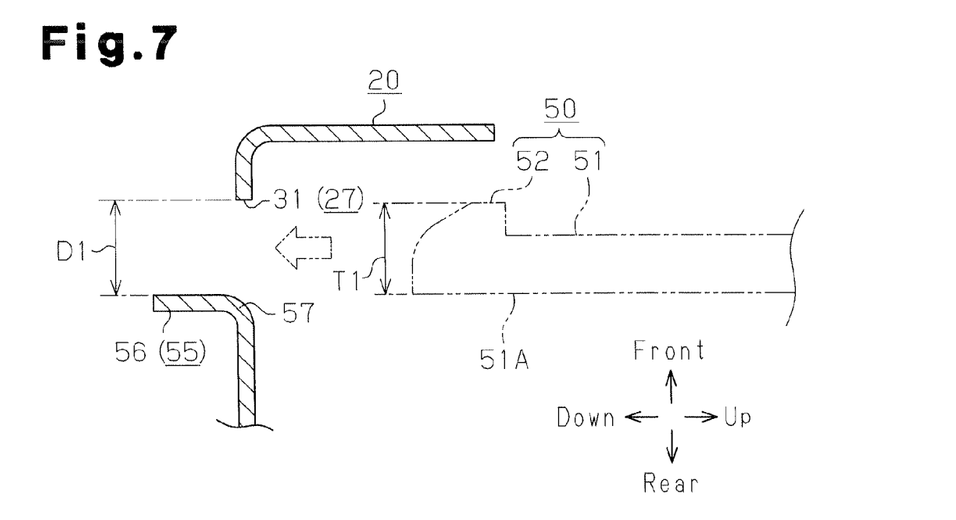
FIG. 7 is a cross-sectional view taken along line 7-7 of FIG. 4.

The engagement claws 50 are integrally formed with the accommodation wall 45, and each engagement claw 50 is located at the lower end (left end as viewed in FIGS. 9 and 10) of one of four wall portions 46 forming the accommodation wall 45. Specifically, the left side wall portion 46 and the right side wall portion 46 each have one engagement claw 50, and the front side wall portion 46 and the rear side wall portion 46 each have two engagement claws 50 (see FIG. 2). As shown in FIGS. 3 and 7, each engagement claw 50 has an insertion portion 51 inserted into the corresponding engagement hole 27, and a claw portion 52 that extends toward the first long inner wall surface 31 from the lower end of the insertion portion 51. The claw portion 52 and the insertion portion 51 of each engagement claw 50 are inserted into the corresponding engagement hole 27, and the claw portion 52 is locked to the lower surface of the bag holder 20 in the vicinity of the first long inner wall surface 31.

Figure 6:
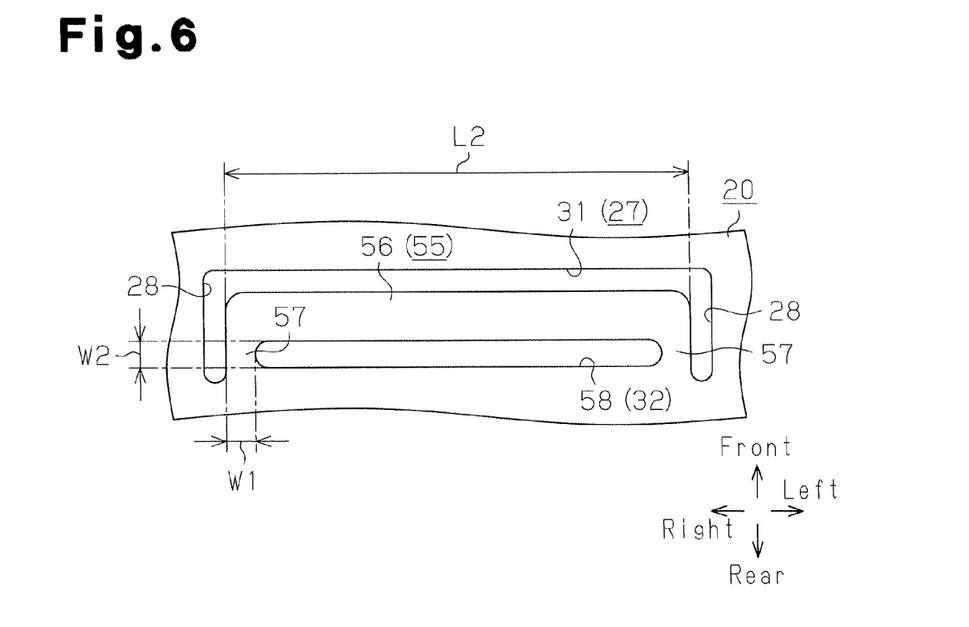
FIG. 6 is an enlarged partial bottom view illustrating a front engagement hole and a fastening piece in the bag holder.
Figure 11:
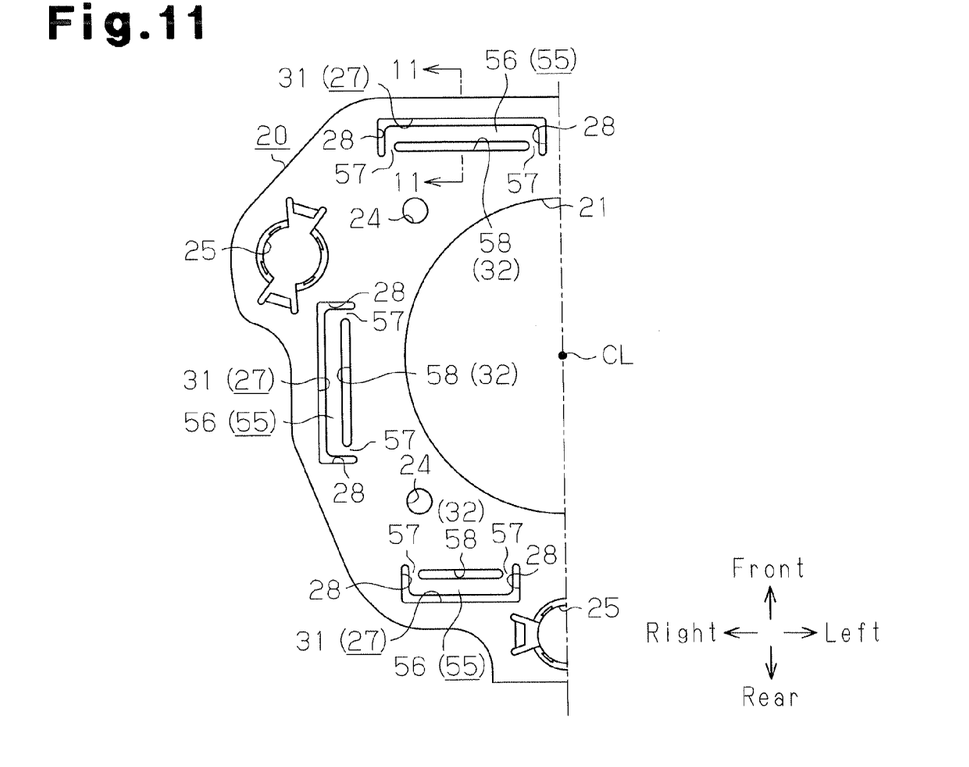
FIG. 11 is a partial bottom view showing the bag holder in a state where the fastening pieces are bent to press the engagement claws.

Further, the bag holder 20 has fastening pieces 55, each of which corresponds to one of the engagement holes 27, as shown in FIGS. 6 and 11. Each fastening piece 55 has a support portion 56 located in the vicinity of the corresponding engagement hole 27, and a pair of coupling portions 57 connecting the support portion 56 to the second long inner wall surface 32 at a plurality of positions. The coupling portions 57 are located at both ends of the fastening piece 55. The support portion 56 of each fastening piece 55 extends along a substantially tangential direction of the opening 21, and has a length L2, which is substantially equal to the length L1 of the claw portions 52 (see FIG. 6). The support portion 56 of the fastening piece 55 is connected to both ends of the second long inner wall surface 32 with the coupling portions 57 at both ends with respect to the substantially tangential direction of the opening 21. The width W1 of each coupling portion 57 along the substantially tangential direction is preferably greater than or equal to 2 mm. The width W1 is determined to ensure the strength of the coupling portions 57 such that, when each fastening piece 55 is bent about the coupling portions 57 by a predetermined angle, the angle of the support portion 56 is maintained.

A slit 58 is formed between the coupling portions 57 of each fastening piece 55. The width W2 of the slit 58 is preferably in a range between 1.5 and 2.0 mm.

The fastening pieces 55 are formed by punching a metal plate when the engagement holes 27 are formed. Prior to insertion of the engagement claws 50 into the engagement holes 27, the fastening pieces 55 are bent downward in the bag holder 20 and in a direction along the central axis CL (see FIG. 7).

The space D1 between the first long inner wall surface 31 and the bent fastening piece 55 is set wider than the maximum thickness T1 of the engagement claw 50. The maximum thickness T1 is a thickness of the claw portion 52 at a part that protrudes from the insertion portion 51 by the greatest amount. The space D1 and the maximum thickness T1 are conditions required for inserting the engagement claws 50 into the engagement holes 27.

Each fastening piece 55 is bent at the coupling portions 57 and pressed against a side surface of the insertion portion 51 on which no claw portion 52 is formed, that is, against a back surface 51A of the insertion portion 51 (see FIG. 3). The back surface 51A is located on the opposite side to the claw portion 52.

The fastening pieces 55 may be structured such that the support portion 56 is connected to the second long inner wall surface 32 of the engagement hole 27 with a single coupling portion 57. In this case, the coupling portion 57 is located at a center of the support portion 56 with respect to the longitudinal direction (the substantially tangential direction). According to this structure, however, when the support portion 56 is bent toward the engagement claw 50 at the coupling portion 57, it is difficult to bend the support portion 56 toward the engagement claw 50 in the same manner as the case where two or more coupling portions 57 are provided, and the support portion 56 is likely to be twisted. If this is the case, it is difficult to press the support portion 56 against the engagement claw 50 in a wide range over the entire length. Thus, it is important that the support portion 56 be connected to the second long inner wall surface 32 with two or more coupling portions 57.

Figure 12:
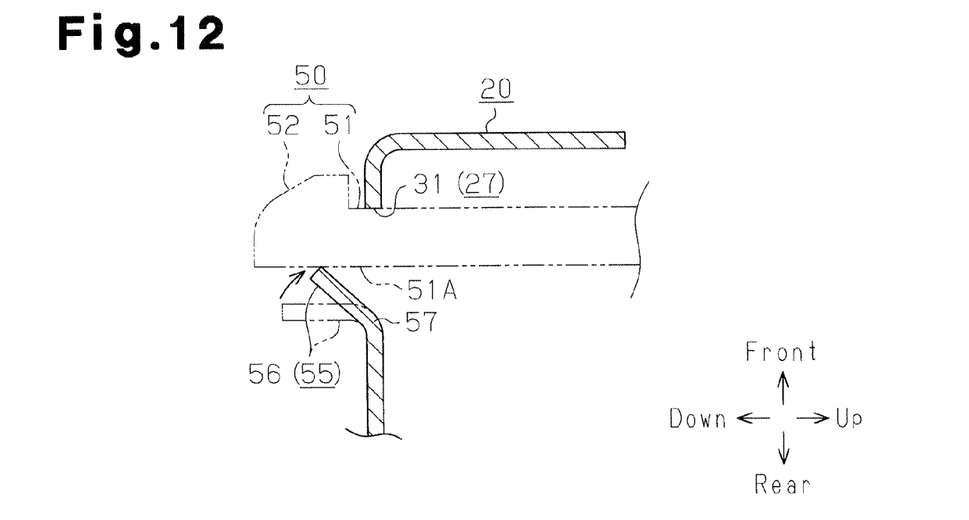
FIG. 12 is a cross-sectional view taken along line 11-11 of FIG. 11.

When fastening the pad cover 40 to the bag holder 20 according to the above described present embodiment, the claw portion 52 and the insertion portion 51 of each engagement claw 50 are inserted into the corresponding engagement hole 27 as shown in FIGS. 7 and 12. At this time, the fastening pieces 55 are bent substantially at the right angle relative to the bag holder 20, so that the fastening pieces 55 extend substantially parallel with the insertion direction of the engagement claws 50. No fastening piece 55 exists in the path of the engagement claws 50. Therefore, the fastening pieces 55 do not resist the insertion of the engagement claws 50.

When each engagement claw 50 is inserted into the corresponding engagement hole 27 as described above, the support portion 56 of the fastening piece 55 is spaced apart from the insertion portion 51 of the engagement claw 50 and close to the second long inner wall surface 32 (see the double-dotted chain lines in FIG. 12). The support portion 56 of each fastening piece 55 is connected to the second long inner wall surface 32 with the two coupling portions 57. Thus, by pressing the support portion 56 toward the insertion portion 51, the fastening piece 55 is bent at the coupling portions 57 as shown by the solid line in FIG. 12, so that the support portion 56 approaches the insertion portion 51. Compared to a case where the support portion 56 is directly connected to the second long inner wall surface 32 rather than with two coupling portions 57, the bent portions, which are coupling portions 57, are clear. Also, the coupling portions 57 can be bent with a smaller force to cause the support portion 56 to approach the insertion portion 51.

The bending direction of the fastening piece 55 in the coupling portions 57 is a direction along which the insertion portion 51 approaches the first long inner wall surface 31 of the engagement hole 27. The bending direction of the fastening piece 55 is the same as the bulging direction of the claw portion 52. Thus, by pushing the fastening piece 55 of the support portion 56 toward the insertion portion 51 and causing the insertion portion 51 to contact the first long inner wall surface 31, the insertion portion 51 contacts the first long inner wall surface 31 without interstice.

At this time, the support portion 56 of each fastening piece 55 extends along a substantially tangential direction of the opening 21, and has the length L2, which is substantially equal to the length L1 of the claw portion 52. Accordingly, the support portion 56 of each fastening piece 55 contacts the insertion portion 51 of the engagement claw 50 in a wide area, so that the force with which the fastening piece 55 is pressed against the engagement claw 50 is increased.

When an impact due to a frontal collision is applied to the vehicle, the inflator 11 supplies inflation gas to the airbag. The inflation gas inflates the airbag. When being inflated, the airbag applies pressing force to various parts of the pad cover 40. When receiving the pressing force, the lid 41 is broken at the breakable portions 42. Through the broken part, the airbag is inflated and deployed upward (toward the driver). The inflated and deployed airbag intervenes between the driver, who is leaning forward due to the collision, and the steering wheel. Accordingly, the forward inclination of the driver is restrained, and the driver is protected from the impact.

Figure 13:
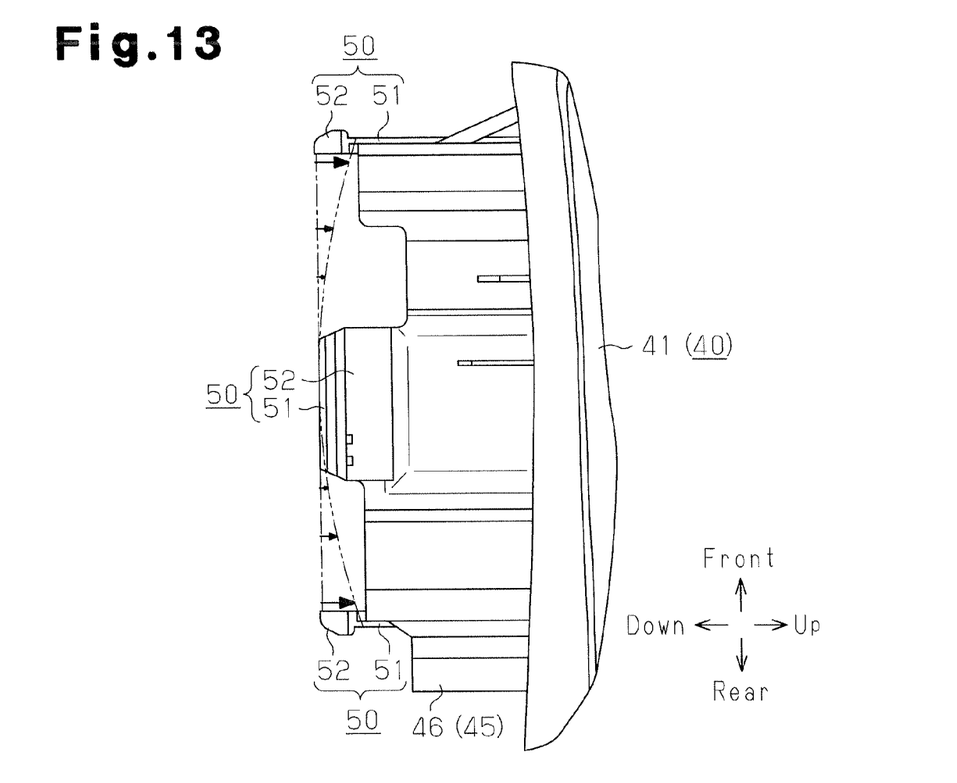
FIG. 13 is a side view showing a state where the airbag is inflated and the pad cover is pulled upward.

When inflated, the airbag pulls the accommodation wall 45 and the engagement claws 50 of the pad cover 40 upward as shown by arrows in FIG. 13. At this time, each of the wall portions 46 forming the accommodation wall 45 is not pulled by force of the same magnitude at all the positions in the substantially tangential direction of the opening 21. Specifically, the force pulling each wall portion 46 increases toward the adjacent wall portion 46. The same applies to the engagement claws 50. That is, the force pulling each engagement claw 50 increases toward the adjacent wall portion 46.

On the other hand, the force with which the support portion 56 of each fastening piece 55 presses the engagement claw 50 is the greatest in the vicinity of the coupling portions 57. In the present embodiment, in which the coupling portions 57 are located at both ends of each fastening piece 55 in the substantially tangential direction, the support portion 56 presses the engagement claw 50 by the greatest force at both ends of the fastening piece 55 in the substantially tangential direction. Therefore, when the both ends of each engagement claw 50 are pulled hard due to the inflation of the airbag, the engagement claw 50 remains engaged with the engagement hole 27.

Figure 14A:
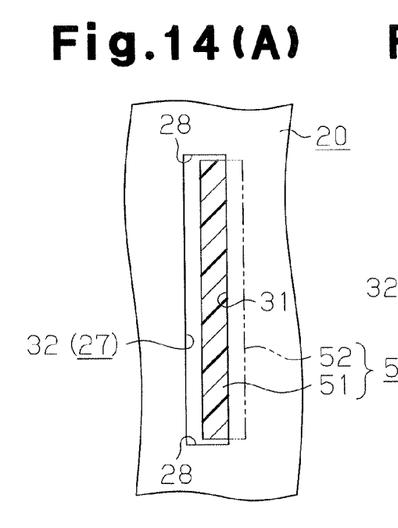
FIG. 14(A) is a partial bottom view illustrating an engagement claw and an engagement hole in a case where no fastening pieces are provided.
Figure 14B:
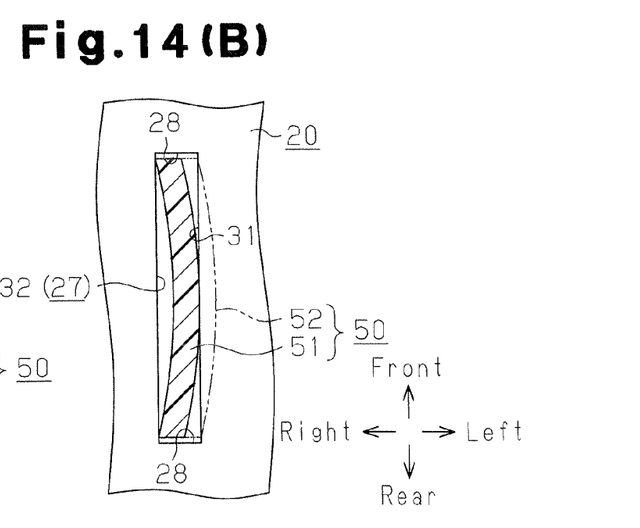
FIG. 14(B) is a partial bottom view illustrating the engagement claw and the engagement hole when the airbag is inflated from the state shown in FIG. 14(A)

When inflated, the airbag pushes the wall portions 46 of the accommodation wall 45 so that the wall portions 46 bulge outward in an arched shape. At this time, each of the wall portions 46, which form the accommodation wall 45, is not evenly flexed at all parts in the substantially tangential direction of the opening 21. Specifically, the farther from the adjacent wall portion 46, the more flexed the wall portion 46 is. Each wall portion 46 has a high rigidity and is hard to flex in sections close to the adjacent wall portion 46, and has a low rigidity and is easy to flex in sections away from the adjacent wall portion 46. The same applies to the engagement claws 50. That is, if there are no fastening pieces 55, the engagement claws 50 are flexed from the state shown in FIG. 14(A) to an arched state as shown in FIG. 14(B).

In contrast, the bag holder 20, which is formed of a metal plate, has a high rigidity and is less likely to be deformed when the airbag is inflated. Accordingly, the engagement holes 27 are unlikely to be deformed.

Therefore, when the engagement claws 50 are flexed into an arched shape as described above, the engaging degree between the claw portion 52 and the engagement hole 27 decreases as the distance from the center of the engagement claw 50 along the substantially tangential direction of the opening 21 increases.

However, in the present embodiment, in which the coupling portions 57 are located at both ends of each fastening piece 55 in the substantially tangential direction, the support portion 56 presses the engagement claw 50 by the greatest force at both ends of the fastening piece 55 in the substantially tangential direction. Therefore, when the wall portions 46 of the bag holder 20 flex into an arched shape due to the inflation of the airbag, the engagement claws 50 are prevented from flexing into an arched shape. As a result, in each engagement claw 50, the claw portion 52 remains engaged with the engagement hole 27 at both ends in the substantially tangential direction of the opening 21 by a similar degree as other parts such as the center part.

The present embodiment described above has the following advantages.

(1) The claw portion 52 and the insertion portion 51 of each engagement claw 50 are inserted into the corresponding engagement hole 27, and the claw portion 52 is locked to the lower surface of the bag holder 20 in the vicinity of the first long inner wall surface 31. Accordingly, the pad cover 40 is fastened to the bag holder 20. The fastening pieces 55 for performing the above described fastening operation are formed integrally with the bag holder 20. Each fastening piece 55 has a support portion 56 located in the vicinity of the corresponding engagement hole 27, and a pair of coupling portions 57 connecting the support portion 56 to the second long inner wall surface 32 at a plurality of positions. By bending the fastening pieces 55 at the coupling portions 57, each fastening piece 55 contacts the back surface 51A of the corresponding insertion portion 51, on which no claw portion 52 is provided.

Thus, the following advantages are achieved.

By bending each fastening piece 55 and pressing it against the corresponding engagement claw 50, the engagement claw 50 is allowed to contact the first long inner wall surface 31 without interstice.

Since the fastening pieces 55 are formed as a single component with the bag holder 20, the number of components is not increased.

By simply bending the fastening pieces 55, the interstice between each insertion portion 51 and the corresponding first long inner wall surface 31 is easily eliminated.

The fastening pieces 55 can be bent with a smaller force compared to a case where the support portion 56 is directly connected to the second long inner wall surface 32 without the coupling portions 57.

Even if dimensional variations exist in parts of the engagement holes 27 and the fastening pieces 55, such variations are accommodated by the bending amounts of the fastening pieces 55. This is because the direction in which each fastening piece 55 is bent is substantially the same as the direction in which the insertion portion 51 of the engagement claw 50 approaches the corresponding first long inner wall surface 31.

(2) At this time, the support portion 56 of each fastening piece 55 extends along a substantially tangential direction of the opening 21, and has the length L2, which is substantially equal to the length L1 of the claw portion 52. Therefore, the engagement claw 50 is pressed by the fastening piece 55 with a great force, so that the insertion portion 51 of the engagement claw 50 is stably maintained contacting the first long inner wall surface 31 without interstice.

(3) Each support portion 56 is connected to the second long inner wall surface 32 of the engagement hole 27 with the coupling portions 57 at both ends with respect to the substantially tangential direction of the opening 21. Therefore, even if both ends of each engagement claw 50 are pulled hard due to inflation of the airbag, the claw 50 is efficiently prevented from coming off the engagement hole 27.

(4) Prior to insertion of the engagement claws 50 into the engagement holes 27, the fastening pieces 55 are bent downward in the bag holder 20 and in a direction along the central axis CL. Therefore, the fastening pieces 55 do not resist the insertion of the engagement claws 50. This allows each engagement claw 50 to be smoothly inserted into the corresponding engagement hole 27.

The present invention may be embodied in the following forms.

The relationship between the first long inner wall surface 31 and the second long inner wall surface 32 in each engagement hole 27 may be reversed from that in the above embodiment. That is, of the pair of long inner wall surfaces in each engagement hole 27, the long inner wall surface extending along the substantially tangential direction in a position closer to the opening 21 may be defined as a "first long inner wall surface 31," and a long inner wall surface extending along the substantially tangential direction in a position farter away from the opening 21 may be defined as a "second long inner wall surface."

Accordingly, in each of the engagement claw 50, a claw portion 52 is formed in a part closer to the opening 21, and the claw portion 52 is locked to the first long inner wall surface 31.

The fastening pieces 55 do not need to be bent prior to insertion of the engagement claws 50 into the engagement holes 27, and the engagement holes 27 may be closed prior to the insertion. In this case, each fastening piece 55 is bent downward by being pressed by the engagement claw 50 as the engagement claw 50 is inserted into the engagement hole 27.

When the insertion portion 51 of the engagement claw 50 contacts the first long inner wall surface 31 after the claw 50 is inserted in the engagement hole 27, the insertion portion 51 is moved away from the support portion 56. Thus, after the insertion, the fastening piece 55 is bent toward the insertion portion 51 at the coupling portion 57, so that the support portion 56 is pressed against the back surface 51A, on which no claws 52 are formed.

In this case, since the fastening piece 55 is pushed and bent as the engagement claw 50 is inserted into the engagement hole 27, the fastening piece 55 does not need to be bent prior to insertion of the engagement claw 50 into the engagement hole 27.

The number of the engagement holes 27 in the bag holder 20 may be changed. For example, by combining the two engagement holes 27 located forward of the opening 21, a single engagement hole 27 may be formed. Likewise, the two engagement holes 27 rearward of the opening 21 may be combined to form a single engagement hole 27.

The engagement hole 27 located left of the opening 21 may be divided into two or more engagement holes 27. Likewise, the engagement hole 27 located right of the opening 21 may be divided into two or more engagement holes 27.

The number of the coupling portions 57 may be changed to three or more. In this modification, a coupling portion 57 may be provided at the center in addition to both ends of the support portion 56 in accordance with, for example, the length of the support portion 56 along the substantially tangential direction of the opening 21. When there are three coupling portions 57, the third coupling portion 57 is preferably provided in the center between both ends. In this case, the coupling portions 57 increase the coupling strength of the support portion 56 to the second long inner wall surface 32, so that the support portion 56 is prevented from flexing when the fastening piece 55 is bent.

Therefore, the present examples and embodiments are to be considered as illustrative and not restrictive and the invention is not to be limited to the details given herein, but may be modified within the scope and equivalence of the appended claims.

The invention claimed is:

1. A pad cover fastening structure for an airbag device having an airbag, the fastening structure comprising:
   a pad cover and a bag holder in which the airbag device is attached to the lower surface of the bag holder for use, wherein the bag holder is located below the airbag of the airbag device and is fastened to the pad cover at a plurality of positions,
   the bag holder includes:
      a central axis;
      a plurality of engagement holes formed about the attaching positions of the airbag device; and
      a plurality of fastening pieces that are integrally formed with the bag holder so as to correspond to the engagement holes,
   each engagement hole has a first long inner wall surface and a second long inner wall surface that face each other while linearly extending along a substantially tangential direction of a circle the center of which coincides with the central axis of the bag holder;
   each fastening piece includes a support portion and a plurality of coupling portions, the support portion being located in the vicinity of the corresponding engagement holes, and the coupling portions connecting the support portion to the second long inner wall surface at a plurality of positions;
   the pad cover includes:
      an annular accommodation wall covering the airbag from the side; and
      a plurality of engagement claws provided below the accommodation wall;
   each engagement claw includes:
      an insertion portion for being inserted into the corresponding engagement holes;
      a claw portion that protrudes from the lower end of the insertion portion toward the corresponding first long inner wall surface; and
      a back surface located on the side opposite to the claw portion with respect to the insertion portion;
   the claw portions and the insertion portions are inserted into the engagement holes, such that each claw portion is locked to the lower surface of the bag holder in the vicinity of the first long inner wall surface; and
   each coupling piece is bent at the coupling portions and caused to contact the back surface of the insertion portion.

2. The pad cover fastening structure according to claim 1, wherein the support portions of each fastening piece extend along a substantially tangential direction of a circle the center of which coincides with the central axis of the bag holder, and have a length that is substantially equal to the length of claw portions.

3. The pad cover fastening structure according to claim 1, wherein the coupling portions of each fastening piece are a pair of coupling portions that are located at both ends of the fastening piece with respect to a substantially tangential direction of a circle the center of which coincides with the central axis of the bag holder, and wherein the support portion of each fastening piece is connected to both ends of the second long inner wall surface via the pair of coupling portions.

4. The pad cover fastening structure according to claim 1, wherein the bag holder and the fastening pieces are formed by pressing a metal plate.

5. The pad cover fastening structure according to claim 1, wherein, prior to insertion of the engagement claws into the engagement holes, the fastening pieces are bent in advance in a direction along the central axis of the bag holder.

6. The pad cover fastening structure according to claim 1, wherein the fastening pieces are pushed and bent downward as the engagement claws are inserted into the engagement holes, and wherein, after the insertion, each fastening piece is bent toward the adjacent insertion portion so as to contact the back surface of the adjacent insertion portion.

7. The pad cover fastening structure according to claim 1, wherein each engagement claw has a maximum thickness at the claw portion, and the space between the first and second long inner wall surfaces is set to be wider than the maximum thickness of the engagement claw.

8. The pad cover fastening structure according to claim 1, wherein the direction in which each fastening piece is bent is a direction in which the insertion portion of the corresponding engagement claw approaches the first long inner wall surface of the corresponding engagement hole.

* * * * *